US005168626A

United States Patent [19]

Dorski et al.

[11] Patent Number: 5,168,626

[45] Date of Patent: Dec. 8, 1992

[54] METHOD FOR PROVIDING PUMP DRIP COLLECTOR

[75] Inventors: Ronald L. Dorski, Castalia; Steven F. Baker, Bellevue, both of Ohio

[73] Assignee: General Motors Corporation, Detroit, Mich.

[21] Appl. No.: 729,261

[22] Filed: Jul. 12, 1991

[51] Int. Cl.[5] .............. B23P 15/00

[52] U.S. Cl. .............. 29/888.021; 29/428; 29/469; 228/2; 228/112

[58] Field of Search .............. 415/168.1, 168.2; 29/428, 469, 888.021; 228/2, 112, 114

[56] References Cited

U.S. PATENT DOCUMENTS 3,895,811 7/1975 Richard, Jr. et al. .
4,571,226 2/1986 Molloy et al. .
4,768,923 9/1988 Baker .
5,071,316 12/1991 Diem et al. .............. 415/168.1

*Primary Examiner*—Edward K. Look
*Assistant Examiner*—Christopher M. Verdier
*Attorney, Agent, or Firm*—Patrick M. Griffin

[57] ABSTRACT

A pump drip collector is easily provided to a pump housing of a particular shape. A cylindrical drum of L-shaped cross section, incapable of serving as a drip collector by itself, is adapted to be freely pressed over a cylindrical protrusion from a flat face of the pump housing. When a circular end edge of the drum engages the face, it is spun welded in place. Thereafter, the drum and pump face together provide a complete drip collector. The drum may also pilot on the outside of the protrusion to maintain concentricity during the spinning process.

3 Claims, 4 Drawing Sheets

METHOD FOR PROVIDING PUMP DRIP COLLECTOR

This invention relates to vehicle coolant pumps generally, and specifically to a method for providing such a pump with a drip collector.

BACKGROUND OF THE INVENTION

Vehicle coolant pumps, generally called water pumps, are powered by belt driven shafts that emerge from a coolant containing housing. A face seal surrounds the shaft to prevent coolant leakage out of the housing, but it inevitably leaks a small amount of coolant. In one type of pump design, the shaft is rotatably supported within a cylindrical bearing race that protrudes from a flat face of the pump housing. An example may be seen in U.S. Pat. No. 4,768,923. The seal is located near the juncture of the bearing race and the housing face, so the vent holes are drilled through the bearing race just outboard of the seal. While it is necessary to vent any leaked coolant to keep it out of the pump shaft support bearings, it is also desirable to prevent the vented coolant from falling directly out onto the ground, or perhaps onto the engine block.

SUMMARY OF THE INVENTION

The disclosed invention is a method for providing a drip collector on the type of pump described above that is simple and cost effective, and which cooperates with the existing pump housing structure.

A cylindrical drum is formed, of a thin material that is friction weld compatible with whatever material the face of the pump housing is made of. The drum is generally L-shaped in cross section, with a cylindrical wall and a radially inwardly extending flange. Because it has no concavities or radial overlap with itself, the drum may be easily manufactured, either by molding or stamping. The cylindrical wall has a diameter larger than the protruding cylindrical bearing race, and is longer than the distance by which the vent holes are spaced from the face of the pump housing. The circular end edge of the cylindrical wall has the proper diameter and shape to be abutted with the face of the pump housing. The diameter of the inner edge of the flange is just larger than the outer surface of the bearing race.

Once the drum is formed, it is coaxially aligned with and pushed axially over the outside of the bearing race until its end edge abuts the face of the pump housing. Then, the cylindrical wall of the drum is maintained coaxial and concentric to the bearing race and the drum is spun while being pushed axially inwardly. This serves to friction weld the drum to the pump housing. In the actual embodiment disclosed, the inner edge of the drum flange is formed with teeth, which engage the spinning tool and can also pilot on the outside of the bearing race to maintain concentricity.

After the drum has been so installed, it and the face of the pump housing cooperatively form a three sided channel of generally U-shaped cross section that surrounds the vent hole. Leaking coolant collects in the channel interior, rather than falling directly out. The radial space left between the circular inner edge of the flange and the outside of the bearing race creates a ready evaporation path for collected coolant, so that it does not build up. In the embodiment disclosed, the space between the flange teeth provides even more evaporation area, in addition to engaging the spinning tool and piloting on the bearing race.

It is, therefore, a general object of the invention to provide a simple and economically applied coolant drip collector that cooperates uniquely with a particular type of pump housing structure.

It is another object of the invention to provide such a drip collector in the form of a cylindrical drum of initially L-shaped cross section which, when installed to the pump housing, cooperates therewith to form a channel with a U-shaped cross section that will collect and hold vented coolant.

It is another object of the invention to provide a cylindrical drum shaped and sized so as to fit over the pump housing structure without interference and attach thereto by a spin welding process.

It is still another object of the invention to provide such a cylindrical drum that also cooperates in the spin welding process by providing a convenient application point for the spin welding tool and a piloting surface to keep the spinning parts concentric.

It is yet another object of the invention to provide special teeth on the edge of the drum flange which serve to engage the spinning tool, keep the spinning drum concentric, and provide extra evaporation area for the collected coolant.

DESCRIPTION OF THE PREFERRED EMBODIMENT

These and other objects and features of the invention will appear from the following written description, and from the drawings, in which:

FIG. 3 is a view like FIG. 1, but showing the drum pressed in place and engaged with the spin welding tool, just prior to being spun welded on;

Figure 1:
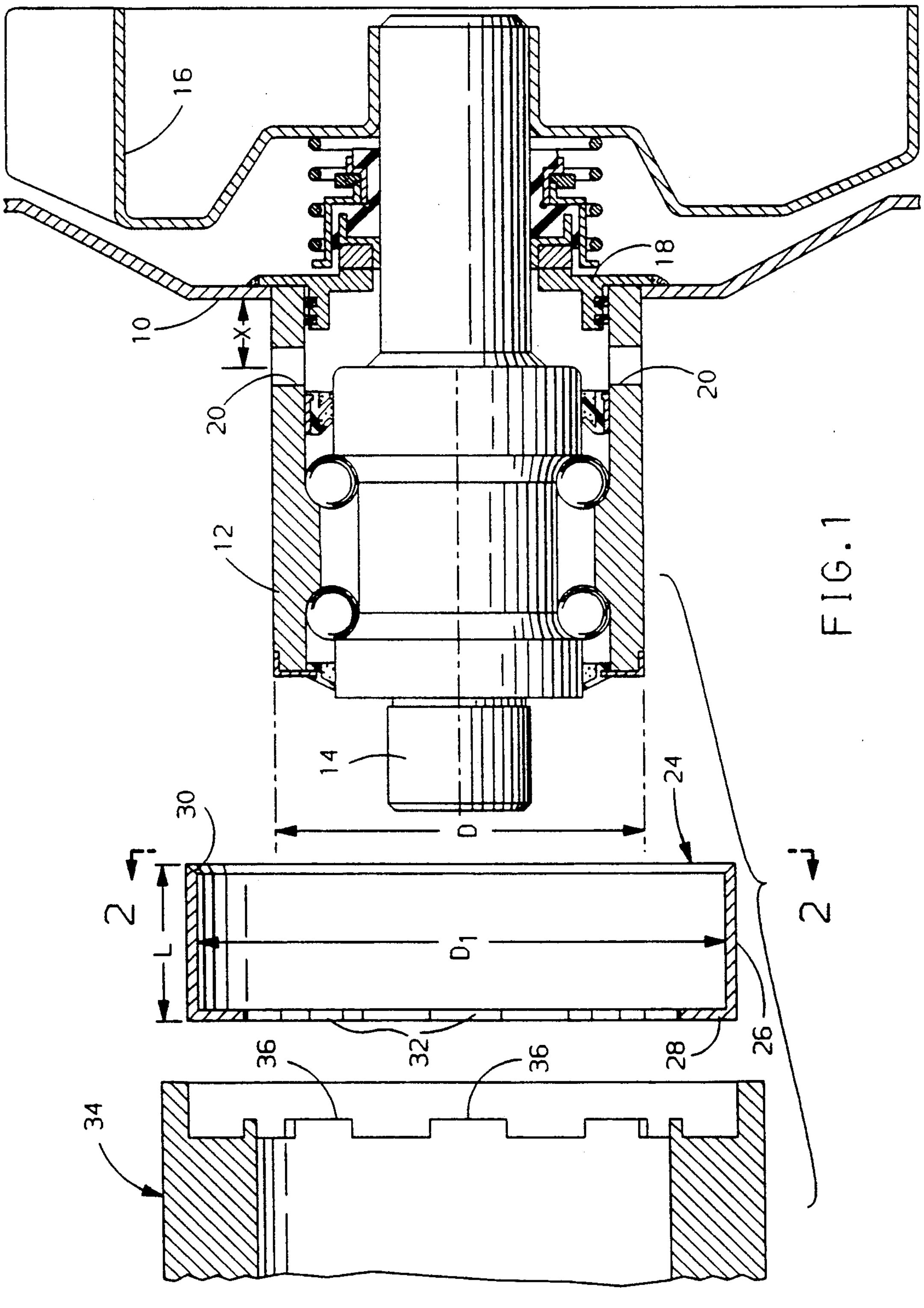
FIG. 1 is a cross sectional view of the type of pump described above, showing the pump shaft in elevation, and showing the drum and spin welding tool aligned.
Figure 4:
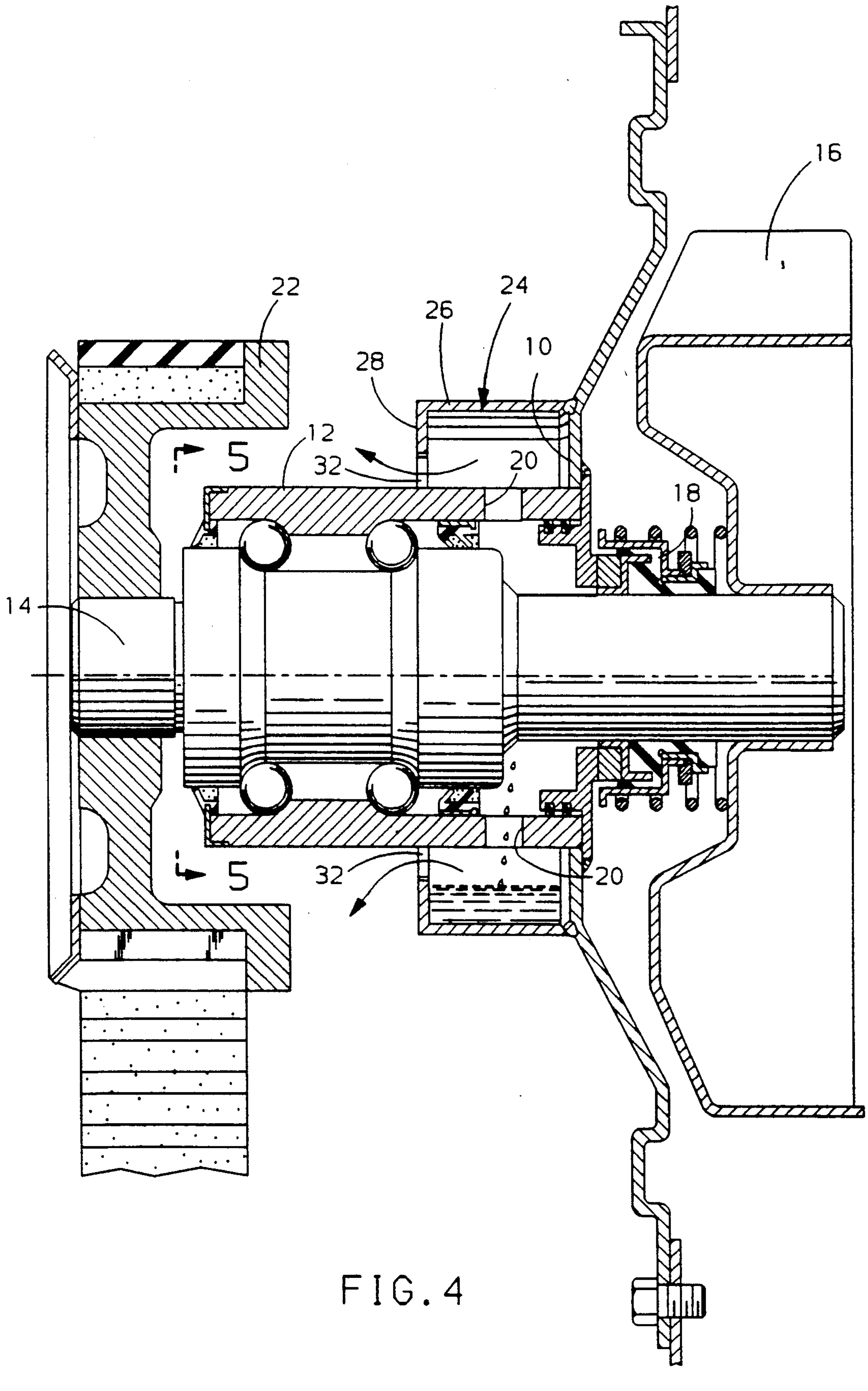
FIG. 4 is a view of the completed drip collector in operation.

Referring first to FIGS. 1 and 4, a vehicle coolant pump housing includes two basic components, a generally flat face 10 and a cylindrical bearing race 12. These are welded together in one unit, so the bearing race 12 in effect constitutes an integral protrusion from the face 10. The bearing race 12 rotatably supports a pump shaft 14, the dotted line axis of which represents the central axis and framework about which other structures and processes are defined. Thus, the face 10 is generally perpendicular to the central axis, while the bearing race 12, especially the outer surface thereof, coaxially surrounds the central axis, with a diameter D. The face 10 is a portion of a larger dish shaped member that would be bolted to a non-illustrated engine block. Face 10 actually becomes conical past a certain radius, but is still flat in the sense that small annular areas of it concentric to the central axis are basically flat. The inner end of pump shaft 14 supports an impeller 16 that turns in a supply of hot coolant, which is not illustrated as such. The coolant is retained by a conventional face seal 18, but is expected to leak a small amount of coolant, which is illustrated. The expected coolant leakage is vented through a pair of diametrically opposed vent holes 20, which are drilled through race 12 just outboard of seal 18. The vent holes 20 are located a known distance X from the face 10. The outer end of shaft 14 is powered by a conventional belt driven pulley 22. The method of the invention works cooperatively within these existing structures and dimensions.

Figure 2:
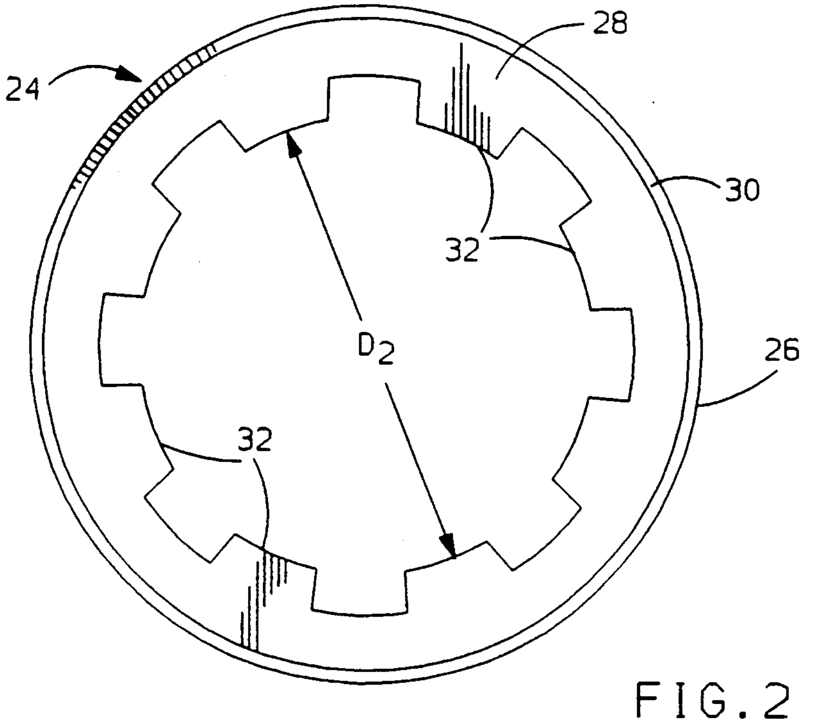
FIG. 2 is an end view of the drum from the perspective of the line 2—2 of FIG. 1.

Referring next to FIGS. 1 and 2, a drum, indicated generally at 24, is generally cylindrical and L-shaped in cross section, with an axially extending cylindrical wall 26 and a radially inwardly extending annular flange 28. Wall 26 has a length L that is greater than X and a diameter $D_1$ that is larger than D, large enough to put its end edge 30 just outboard of the transition circle between the totally flat and conical portions of pump housing face 10. The end edge 30 is actually beveled to an extent so that it is capable of being closely abutted with face 10 at that point. The inner edge of flange 28 is generally circular, but more specifically comprises an evenly spaced series of teeth 32, the inner ends of which are arcuate and lie on a circle of diameter $D_2$. The diameter $D_2$ is substantially equal to, just slightly greater than D, for a reason described below. However, so long as there is any diameter differential, even a millimeter or so, drum 24 will fit easily over the outer surface of bearing race 12.

Clearly, the firs step in the method is to manufacture drum 24 to the size and shape described above. Because of the L-shaped cross section, drum 24 is incapable of serving as a drip collector by itself. But, since it has no concavities or undercuts, as a channel of U-shaped cross section would, it can be easily made. It can be stamped of a thin metal with no back folding, or molded of a plastic material with two simple, axially parting molds. The choice of material from drum 24 would be dictated by compatibility with the material of pump housing face 10. That is, both could be steel, as shown. Or, if the pump face 10 was coated with a non-metallic layer of epoxy, then a material such as urethane would be suitable. A spin welding tool, indicated generally at 34, is also generally cylindrical and hollow, and is large enough to fit with radial clearance over the outside of bearing race 12. Tool 34 also has a series of teeth 36 sized to interfit with the drum teeth 32. Therefore, drum 24 can be loaded onto and into tool 34. Tool 34 would be chucked in a lathe or similar machine capable of applying a simultaneous axial force and spinning action.

Figure 5:
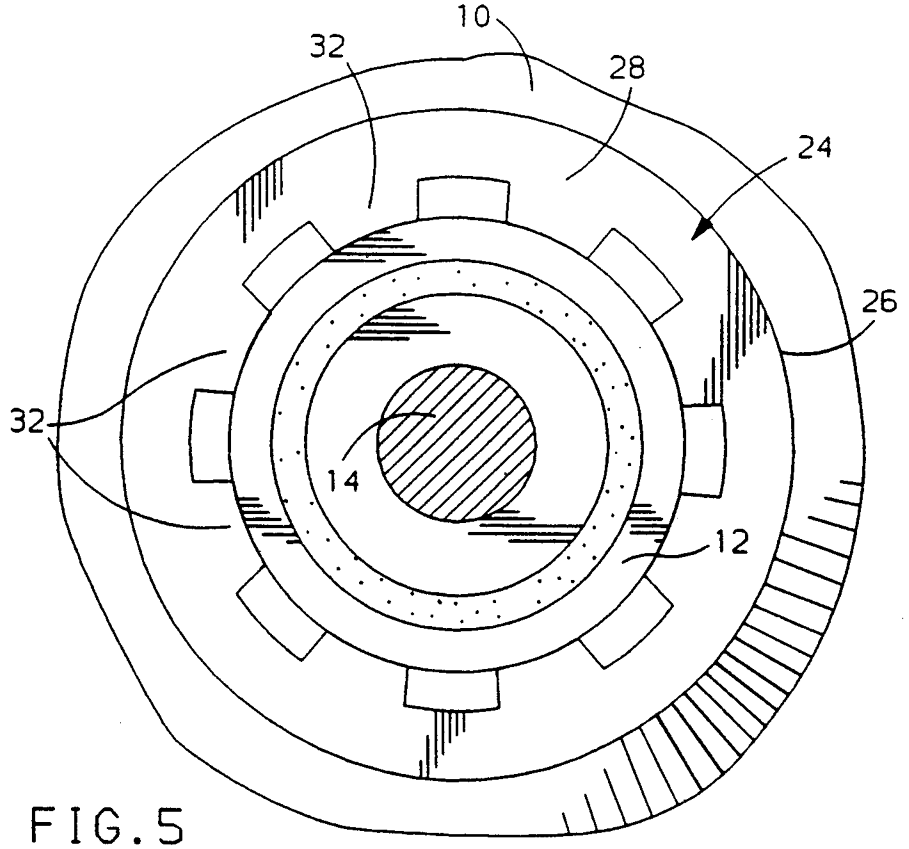
FIG. 5 is a cross sectional view taken along the line 5—5 of FIG. 4.
Figure 3:
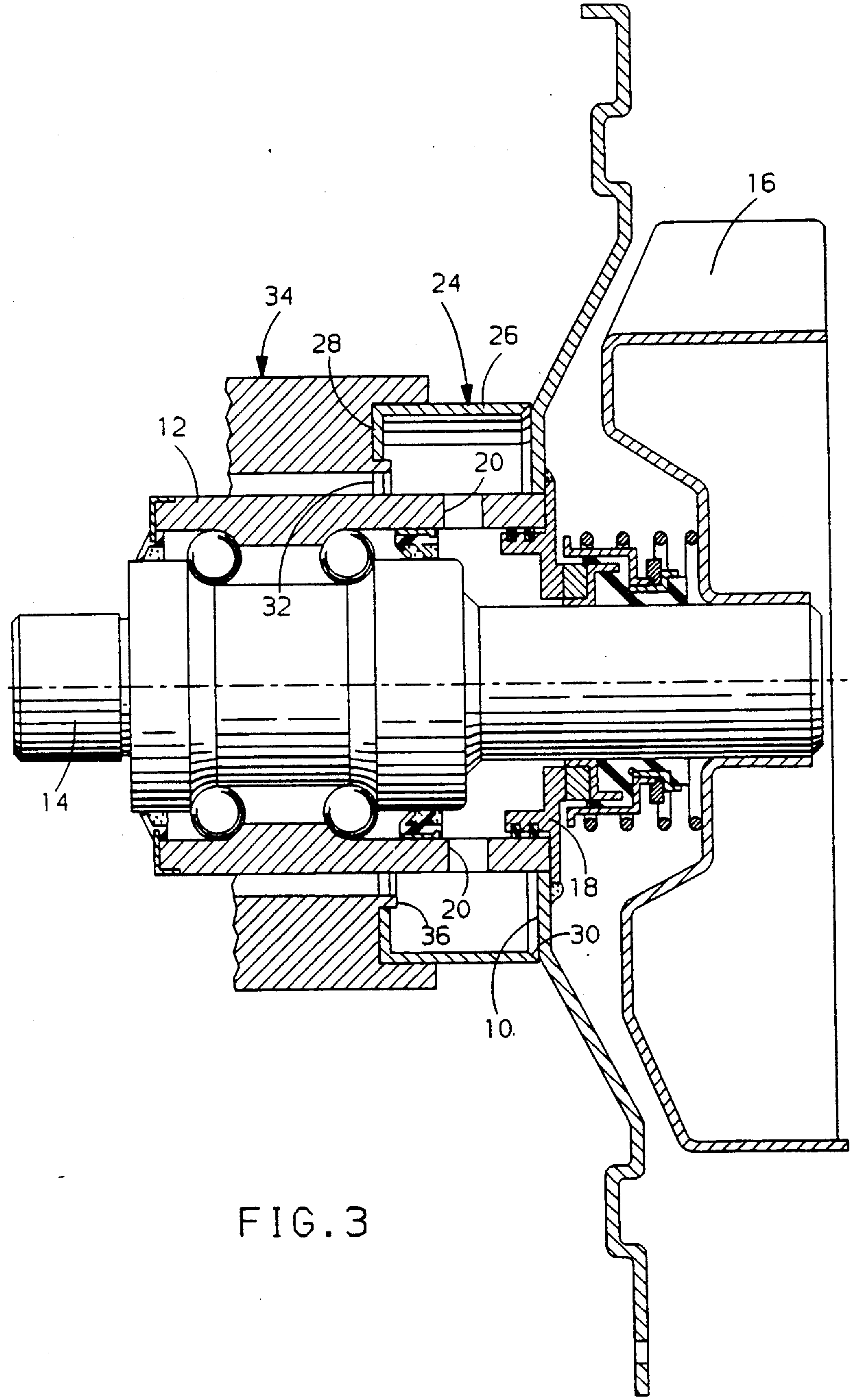

Referring next to FIGS. 3 and 5, the next step is to simultaneously insert the tool 34 and the drum 24 retained thereon over the outside of bearing race 12. The inner ends of the teeth 32 fit closely to the outer surface of bearing race 12, but not so close as to bind or impede insertion. The end edge 30 is shown short of the housing face 10 in FIG. 3, just prior to abutment. That abutment is close and continuous, since each is flat over the thin annular area that is in actual contact. As tool 34 is operated, it is maintained coaxial to the central axis of bearing race 12, assuring that the end edge 30 does not wobble excessively as it spins in contact with the face 10. This concentricity may be maintained externally. In the disclosed embodiment, however, concentricity is maintained by the arcuate ends of the drum flange teeth 32 piloting on the outer surface of bearing race 12, as seen in FIG. 5. The heat of friction produced by the forceful spinning of drum 24 welds edge 30 to pump housing face 10. If the two are of compatible metals, then the mechanism of joining is basically the same as welding any other metals. If the drum 24 is urethane and the surface of face 10 is epoxy coated, it is thought that the mechanism of joining is somewhat different. Though it is not yet fully understood, it appears that some of the urethane melts and bonds somehow to the surface of the epoxy layer. In any event, the process steps followed are basically the same, as is the end result.

Referring next to FIGS. 4 and 5, the completed installation is shown. With edge 30 welded to housing face 10, drum 24 and face 10 together form a three sided, channel shaped drip collector of U-shaped cross section that completely surrounds the vent holes 20. The length of drum wall 26 assures that the vent holes 20 are covered. The connection is complete and solid on both sides of drum 24, with the welded edge 30 on one side and the teeth 32 resting just on the surface of bearing race 12 on the other. Any coolant exiting the vent holes 20 is collected in the concave interior of the drip collector, puddling at the bottom dead center. The space between the teeth 32 allows more than sufficient room for the collected coolant to evaporate to ambient, so that it should not overflow and drip to the ground. There is generally ample heat available in such an environment to enhance evaporation. To summarize, a drip collector is provided by applying a simple and easy to make component, the drum 24, which forms a complete channel in cooperation with the existing pump housing face 10. The installation process itself works with the existing bearing race 12. So, the additional feature of coolant leak collection is had with little extra cost, and with no change to existing product.

Variations in the disclosed method could be made. The drum 24 could be used with any pump housing that had a face with a cylindrical protrusion and vent hole near the juncture thereof. The cylindrical protrusion would not necessarily have to be a bearing race like 12, as it is the shape and orientation, rather than its function, that is most relevant to the method of the invention. The inner edge of drum flange 28 could be made simply circular, without the teeth 32. In that case, it could be given a larger diameter $D_2$, so as to have enough radial clearance from the outer surface of bearing race 12 to provide an evaporation path. Or, it could be given the same close fitting diameter, with separate holes drilled through flange 28 to provide the evaporation path. Tool engagement surfaces other than the teeth 32 could be provided in drum 24. For example, lugs could be integrally molded to the surface of flange 28, or flats could be stamped into the surface of drum wall 26. The teeth 32 are particularly useful, however, as they provide tool engagement surfaces, piloting surfaces, and evaporation clearance. The shape of the drum wall and edge 30 could be flat instead of beveled, depending on the shape of the particular area of pump housing face 10 that it would be contacting. Therefore, it will be understood that it is not intended to limit the invention to just the embodiment disclosed.

These and other objects and features of the invention will appear from the following written description, and from the drawings, in which: We claim:

1. A method for providing a drip collector to a vehicle coolant pump housing having a central axis, a generally flat face substantially perpendicular to said central axis, and a cylindrical protrusion from said face surrounding said central axis, said protrusion also having at least one coolant vent hole axially spaced from said face by a predetermined amount, comprising the steps of, forming a generally cylindrical drum with a cylindrical wall having a diameter larger than said protrusion, a length longer than said predetermined spacing and a circular end edge adapted to abut said annular face, said drum also having a radially inwardly extending flange with a circular inner edge sized to fit over said cylindrical protrusion, coaxially aligning said drum with said cylindrical protrusion, axially inserting said drum over said protrusion until said end edge abuts said annular face, and, maintaining said drum cylindrical wall coaxial to said protrusion while forcibly spinning said end edge against said pump housing face until said end edge friction welds to said face, said housing face and said drum thereafter cooperatively forming a channel shaped drip collector overlying and surrounding said vent hole.

2. A method for providing a drip collector to a vehicle coolant pump housing having a central axis, a generally flat face substantially perpendicular to said central axis, and a cylindrical protrusion from said face surrounding said central axis, said protrusion also having at least one coolant vent hole axially spaced from said face by a predetermined amount, comprising the steps of, forming a generally cylindrical drum with a cylindrical wall having a diameter larger than said protrusion, a length longer than said predetermined spacing and a circular end edge adapted to abut said annular face, said drum also having a radially inwardly extending flange with a circular inner edge sized to fit closely to said cylindrical protrusion without binding, coaxially aligning said drum with said cylindrical protrusion, axially inserting said drum over said protrusion until said end edge abuts said annular face, and, forcibly spinning said drum as said drum flange inner edge pilots on said pump housing cylindrical protrusion until said end edge friction welds to said face, said housing face and said drum thereafter cooperatively forming a channel shaped drip collector overlying and surrounding said vent hole.

3. A method for providing a drip collector to a vehicle coolant pump housing having a central axis, a generally flat face substantially perpendicular to said central axis, and a cylindrical protrusion from said face surrounding said central axis, said protrusion also having at least one coolant vent hole axially spaced from said face by a predetermined amount, comprising the steps of, forming a generally cylindrical drum with a cylindrical wall having a diameter larger than said protrusion, a length longer than said predetermined spacing and a circular end edge adapted to abut said annular face, said drum also having a radially inwardly extending flange with a series of teeth thereon sized to fit closely to said cylindrical protrusion without binding, coaxially aligning said drum with said cylindrical protrusion, interfitting said drum teeth with a tool adapted to forcibly spin said drum, axially inserting said tool and interfitted drum over said protrusion until said end edge abuts said annular face, and, spinning said tool and drum as said drum flange teeth pilot on said pump housing cylindrical protrusion until said end edge friction welds to said face, said housing face and said drum thereafter cooperatively forming a channel shaped drip collector overlying and surrounding said vent hole from which collected coolant may evaporate between said teeth.

* * * * *